(12) United States Patent
Huang et al.

(10) Patent No.: US 11,687,974 B1
(45) Date of Patent: Jun. 27, 2023

(54) IDENTIFYING CONTENT TO PRESENT TO A GROUP OF ONLINE SYSTEM USERS BASED ON USER ACTIONS AND SPECIFIED BY A THIRD-PARTY SYSTEM

(71) Applicant: META PLATFORMS, INC., Menlo Park, CA (US)

(72) Inventors: Yi Huang, Pleasanton, CA (US); Peng Fan, Palo Alto, CA (US); Zhimin Chen, Santa Clara, CA (US); Keyun Tong, Fremont, CA (US)

(73) Assignee: META PLATFORMS, INC., Menlo Park, CA (US)

( * ) Notice: Subject to any disclaimer, the term of this patent is extended or adjusted under 35 U.S.C. 154(b) by 0 days.

(21) Appl. No.: 17/131,338

(22) Filed: Dec. 22, 2020

Related U.S. Application Data

(63) Continuation of application No. 16/670,747, filed on Oct. 31, 2019, now abandoned, which is a continuation of application No. 14/698,822, filed on Apr. 28, 2015, now Pat. No. 10,497,024.

(51) Int. Cl.
  *G06Q 30/02* (2023.01)
  *G06Q 30/0251* (2023.01)
  *H04L 67/50* (2022.01)

(52) U.S. Cl.
  CPC ....... *G06Q 30/0269* (2013.01); *H04L 67/535* (2022.05)

(58) Field of Classification Search
  CPC .......................... G06Q 30/0269; H04L 67/535
  See application file for complete search history.

(56) References Cited

U.S. PATENT DOCUMENTS

| | | | |
|---|---|---|---|
| 2008/0221987 A1* | 9/2008 | Sundaresan | G06Q 30/0277 705/14.54 |
| 2011/0258529 A1* | 10/2011 | Doig | G06Q 30/02 726/22 |
| 2012/0281963 A1* | 11/2012 | Krapf | G06Q 30/02 386/239 |
| 2013/0054484 A1* | 2/2013 | Hoeflinger | G06Q 30/0273 705/329 |
| 2014/0324527 A1* | 10/2014 | Kulkarni | G06F 8/00 705/7.29 |
| 2015/0066625 A1* | 3/2015 | McDonald | G06Q 30/0239 705/14.39 |

(Continued)

*Primary Examiner* — Scott C Anderson
(74) *Attorney, Agent, or Firm* — Mannava & Kang, P. C.

(57) ABSTRACT

An online system receives information describing a target group of online system users from a third party system that includes one or more user properties, which may identify an action performed by a an online user within a time interval to include the user in the target group. When an opportunity to present advertisement requests to a user is identified, the online system retrieves actions associated with the user and times associated with the actions. If an action associated with the user matches the action identified by the user properties and occurred within the time interval identified by the user properties, and other characteristics of the user satisfy at least a threshold number of the user properties, the online system includes the user in the target group. Advertisement requests having targeting criteria, including the target group, satisfied by characteristics of the user are evaluated for presentation to the user.

20 Claims, 4 Drawing Sheets

(56) References Cited

U.S. PATENT DOCUMENTS

2015/0143534 A1* 5/2015 Bowles .............. G06Q 30/0277
 726/26
2015/0237056 A1* 8/2015 Arnold .................. H04L 67/306
 726/4

* cited by examiner

IDENTIFYING CONTENT TO PRESENT TO A GROUP OF ONLINE SYSTEM USERS BASED ON USER ACTIONS AND SPECIFIED BY A THIRD-PARTY SYSTEM

CROSS REFERENCE TO RELATED APPLICATIONS

This application is a continuation of commonly assigned and co-pending U.S. patent application Ser. No. 16/670,747, filed Oct. 31, 2019, which is a continuation of U.S. patent application Ser. No. 14/698,822, filed Apr. 28, 2015, which are hereby incorporated by reference in their entireties.

BACKGROUND

This disclosure relates generally to identifying users of an online system, and more particularly to maintaining information describing groups of online system users specified by a third party system.

An online system allows users to connect to and to communicate with other users of the online system. Users create profiles on an online system that are tied to their identities and include information about the users, such as interests and demographic information. The users may be individuals or entities such as corporations or charities. Content items are presented to various users by the online system to encourage users to interact with the online system.

As the amount of content provided by the online system increases, users may be presented with an increasing amount of content in which the users have little interest. To provide users with content more likely to be relevant, content items may be associated with targeting criteria specifying characteristics of users eligible to be presented with the content item. This limits presentation of a content item to users having characteristics satisfying the targeting criteria.

While the online system maintains targeting criteria for identifying groups of users satisfying various targeting criteria, a third party system may provide information to the online system identifying groups of online system users. Conventional online systems merely store information from third party systems identifying groups of users, allowing a third party system to identify a group of users to receive content. However, a third party system may want to regulate access to information identifying groups of users provided by the third part system. Further, a third party system may request compensation for the use of its information identifying groups of users by additional third party systems or by the online system.

SUMMARY

An online system receives information from a third party system describing a target group that includes multiple users of the online system. Identifying a target group allows the third party system to specify a customized group of online system users to receive content. In one embodiment, information describing the target group includes one or more user properties. The user properties may identify specific users of the online system or may identify one or more characteristics of users of the online system in the target group. For example, user properties describing the target group identify actions performed by online system users so online system users who performed at least a threshold number of the identified actions are included in the target group. Actions identified by the user properties may be actions performed by an online system user on the online system or performed by the online system on third party systems communicating with the online system. Example actions include a user interacting with a content item provided by the third party system or the user purchasing a product provided by the third party system. In addition to identifying actions, user properties may associate a time interval with an action, so a user is included in the target group described by the user properties if the user performed the action within the time interval associated with the action. For example, user properties describing the target group identify an action of purchasing a specific product provided by the third party system within 48 hours of a current time for a user to be included in the target group.

When the online system identifies an opportunity to present one or more advertisement requests ("ad request") to an online system user, the online system determines if the user is associated with a target group. For example, the online system receives a request from an application executing on a client device associated with the user for content items to present to the user; the received request may identify a number of ad requests to include in the content items to present to a user. Characteristics of the user retrieved by the online system include actions associated with the user by the online system. Based on the characteristics of the user and the user properties describing the target group, the online system determines if the user is included in the target group. The online system includes the user in the target group if the characteristics of the user satisfy at least a threshold number of user properties describing the target group.

In some embodiments, if the user properties describing the target group include an action and a time interval associated with the action, the online system determines whether an action associated with the user matches the action included in the user properties and occurred at a time within the time interval associated with the action. If the action associated with the user matches the action included in the user properties and occurred at a time within the time interval associated with the action and characteristics associated with the user satisfy at least a threshold number of user properties, the online system identifies the user as included in the target group. When the online system identifies an opportunity to present one or more ad requests to the user, the online system determines whether a most recent action associated with the user and matching the action included in the user properties occurred within the time interval associated with the action by the user properties, allowing the online system to determine whether the user continues to be included in the target group when different opportunities to present ad requests to the user are identified. As the user's characteristics change over time, identifying actions occurring most recently to a time when an opportunity to present one or more ad requests is identified allows the online system to account for changes in the user's actions that may cause the user to no longer satisfy the threshold number of user properties. For example, user properties describing the target group specify an action of viewing content provided by the third party system within 48 hours of a current time. Based on actions associated with the user, including actions associated with the user after an initial determination the user was included in the target group, the online system determines if the user has viewed content provided by the third party system within 48 hours of the current time to determine if the user remains included in the target group. If the user's most recent viewing of content provided by the third party system occurred more than 48 hours from the current time, the online system determines the user is no longer included in the target group. However, if the user viewed content provided by the third party system within 48 hours of the current time, the online system determines the user remains included in the target group.

The online system retrieves ad requests including the target group as targeting criteria and identifies ad requests including at least a threshold number of targeting criteria that are satisfied by characteristics of the user as candidate ad requests. For example, after determining the user is included in the target group, the online system identifies ad requests with targeting criteria specifying inclusion in the target group without specifying additional user characteristics as candidate ad requests (e.g., ad requests including an identifier of the target group in targeting criteria, ad requests including targeting criteria specifying a combination of user characteristics matching user properties describing the target group). For ad requests including targeting criteria identifying the target group and other characteristics, the online system identifies the ad request as candidate ad requests if inclusion in the target group and other characteristics of the user satisfy at least a threshold number of the targeting criteria.

Using one or more selection processes, the online system determines measures of relevance of various candidate ad requests to the user based on characteristics associated with the user by the online system and characteristics of the candidate ad requests. Based on the measures of relevance, the online system selects one or more candidate ad requests for presentation to the user. Additionally, bid amounts associated with candidate ad requests may be used to select candidate ad requests for presentation to the user. For example, the online system determines an expected value associated with various candidate ad requests based on their bid amounts and selects candidate ad requests based on their bid amounts and measures of relevance to the user. In some embodiments, the online system selects candidate ad requests having at least a threshold expected value for presentation. The selected candidate ad requests are presented to the user by the online system.

In some embodiments, the online system selects content for presentation by a candidate ad request, such as a selected candidate ad request, based on characteristics associated with the user. For example, a selected candidate ad request includes an instruction for the online system to select content presented by the selected candidate ad request based on actions associated with the user. The instruction may identify a specific action or a time interval, so the online system retrieves the specific action performed by the user or retrieves actions performed by the user within the time interval and identifies objects (e.g., products, content items) associated with the retrieved actions. An object associated with a retrieved action is selected for presentation by the selected candidate ad request. As another example, the instruction in the selected candidate ad request identifies an object and a time interval, so the online system retrieves actions performed by the user associated with the object and occurring within the time interval and includes information describing the object and one or more of the retrieved actions in the selected candidate ad request. In another example, the instruction in the selected candidate ad request identifies a time interval, and the online system includes an object associated with a maximum number of actions in the time interval in the selected candidate content item; similarly, the online system may include an object associated with a maximum number of a specific action (identified by the selected candidate ad request) within the time interval in the selected candidate content item. In other embodiments, the online system identifies objects with which the user performed an action (or performed one or more specific actions) at times closest to a current time; based on the identified objects, the online system selects content for presentation by the candidate ad request (e.g., content associated with a particular action or associated with a most recent time).

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

System Architecture

Figure 1:
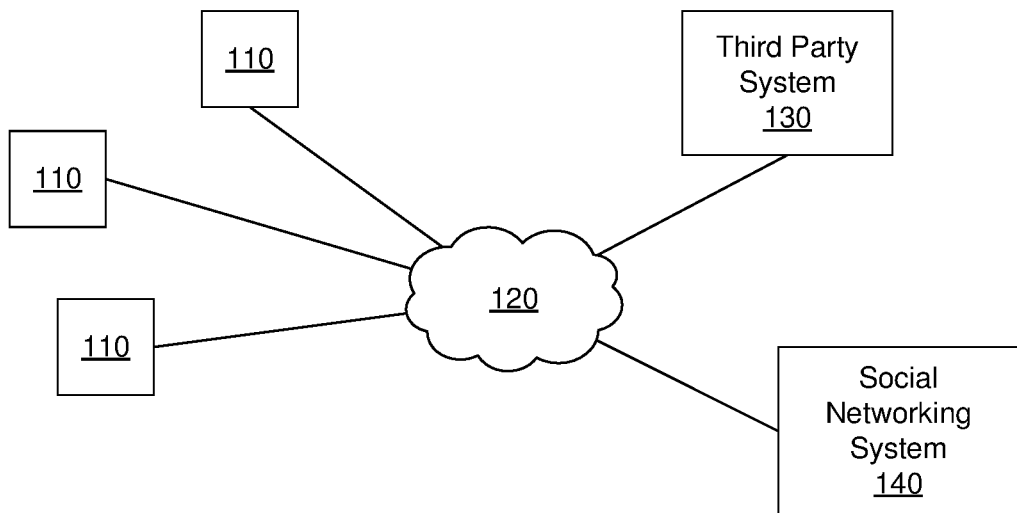
FIG. 1 is a block diagram of a system environment in which an online system operates, in accordance with an embodiment.

FIG. 1 is a block diagram of a system environment 100 for an online system 140. The system environment 100 shown by FIG. 1 comprises one or more client devices 110, a network 120, one or more third-party systems 130, and the online system 140. In alternative configurations, different and/or additional components may be included in the system environment 100.

The client devices 110 are one or more computing devices capable of receiving user input as well as transmitting and/or receiving data via the network 120. In one embodiment, a client device 110 is a conventional computer system, such as a desktop or a laptop computer. Alternatively, a client device 110 may be a device having computer functionality, such as a personal digital assistant (PDA), a mobile telephone, a smartphone or another suitable device. A client device 110 is configured to communicate via the network 120. In one embodiment, a client device 110 executes an application allowing a user of the client device 110 to interact with the online system 140. For example, a client device 110 executes a browser application to enable interaction between the client device 110 and the online system 140 via the network 120. In another embodiment, a client device 110 interacts with the online system 140 through an application programming interface (API) running on a native operating system of the client device 110, such as IOS® or ANDROID™.

The client devices 110 are configured to communicate via the network 120, which may comprise any combination of local area and/or wide area networks, using both wired and/or wireless communication systems. In one embodiment, the network 120 uses standard communications technologies and/or protocols. For example, the network 120 includes communication links using technologies such as Ethernet, 802.11, worldwide interoperability for microwave access (WiMAX), 3G, 4G, code division multiple access (CDMA), digital subscriber line (DSL), etc. Examples of networking protocols used for communicating via the network 120 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 120 may be represented using any suitable format, such as hypertext markup language (HTML) or extensible markup language (XML). In some embodiments, all or some of the communication links of the network 120 may be encrypted using any suitable technique or techniques.

One or more third party systems 130 may be coupled to the network 120 for communicating with the online system 140, which is further described below in conjunction with FIG. 2. In one embodiment, a third party system 130 is an application provider communicating information describing applications for execution by a client device 110 or communicating data to client devices 110 for use by an application executing on the client device. In other embodiments, a third party system 130 provides content or other information for presentation via a client device 110. A third party system 130 may also communicate information to the online system 140, such as advertisements, content, information describing a group of users of the online system 140, or information about an application provided by the third party system 130. In some embodiments, a third party system 130 may communicate information directly to the online system 140.

In some embodiments, a third party system 130 includes a tracking mechanism (e.g., a tracking pixel) into content provided by the third party system 130, such as web pages. The tracking mechanism is code included in content provided by the third party system 130 that, when executed by a client device 110 presenting the content, communicates a request for content from the client device 110 to the online system 140 that includes information identifying the user to the online system 140 retrieved from the client device 110 and information describing the content from the third party system 130 that is presented. In some embodiments, different tracking mechanisms are included in different content provided by a third party system 130, such as different web pages provided by the third party system 130. For example, a third party system 130 includes different tracking pixels on different web pages provided by the third party system 130. Alternatively, a common tracking pixel is included in different web pages provided by the third party system 130. For example, a third party system 130 provides various websites that are each associated with a different tracking pixel where multiple web pages associated with a website include the tracking pixel associated with the website. A tracking mechanism included in content provided by a third party system 130 may communicate any suitable information to the online system 140 when executed by the client device 110. Examples of information communicated by a tracking mechanism include information identifying the third party system 130 (e.g., an advertiser), information identifying the content from the third party system 130 presented, a date and time when the content from the third party system 130 was accessed, information associated with a user of the client device 110 presenting the content from the third party system 130 by the online system 140, etc.

Figure 2:
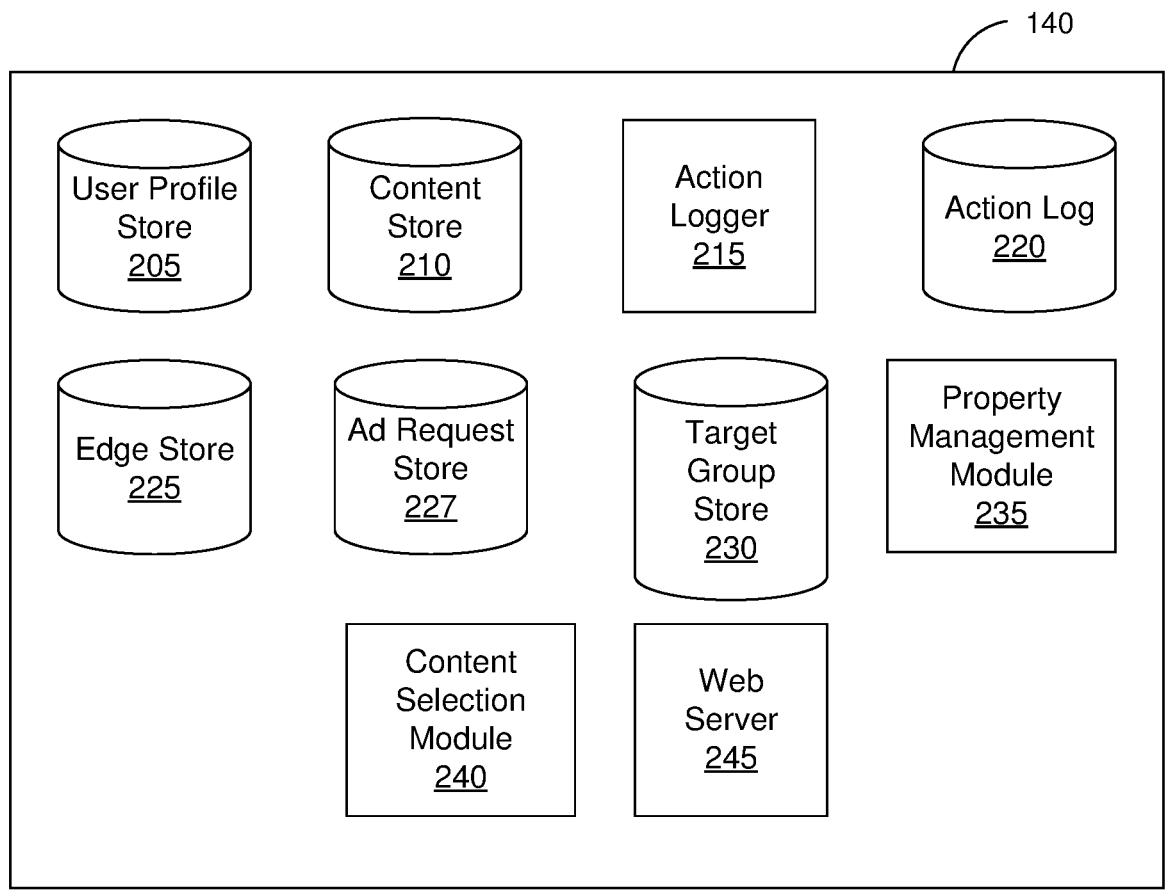
FIG. 2 is a block diagram of an online system, in accordance with an embodiment.

FIG. 2 is a block diagram of an architecture of the online system 140. For example, the online system 140 is a social networking system. The online system 140 shown in FIG. 2 includes a user profile store 205, a content store 210, an action logger 215, an action log 220, an edge store 225, an advertisement request ("ad request") store 227, a target group store 230, a property management module 235, a content selection module 240, and a web server 245. The online system 140 may be a social networking system 140 in some embodiments or may be any system presenting content to its users. In other embodiments, the online system 140 may include additional, fewer, or different components for various applications. Conventional components such as network interfaces, security functions, load balancers, failover servers, management and network operations consoles, and the like are not shown so as to not obscure the details of the system architecture.

Each user of the online system 140 is associated with a user profile, which is stored in the user profile store 205. A user profile includes declarative information about the user that was explicitly shared by the user and may also include profile information inferred by the online system 140. In one embodiment, a user profile includes multiple data fields, each describing one or more attributes of the corresponding online system user. Examples of information stored in a user profile include biographic, demographic, and other types of descriptive information, such as work experience, educational history, gender, hobbies or preferences, location and the like. A user profile may also store other information provided by the user, for example, images or videos. In certain embodiments, images of users may be tagged with information identifying the online system users displayed in an image. A user profile in the user profile store 205 may also maintain references to actions by the corresponding user performed on content items in the content store 210 and stored in the action log 220. In some embodiments, a third party system 130 may indirectly retrieve information from the user profile store 205, subject to one or more privacy settings associated with user profiles by users of the online system 140, to identify a user profile in the user profile store 205 associated with a user of the third party system 130.

While user profiles in the user profile store 205 are frequently associated with individuals, allowing individuals to interact with each other via the online system 140, user profiles may also be stored for entities such as businesses or organizations. This allows an entity to establish a presence on the online system 140 for connecting and exchanging content with other online system users. The entity may post information about itself, about its products or provide other information to users of the online system 140 using a brand page associated with the entity's user profile. Other users of the online system 140 may connect to the brand page to receive information posted to the brand page or to receive information from the brand page. A user profile associated with the brand page may include information about the entity itself, providing users with background or informational data about the entity.

The content store 210 stores objects that each represent various types of content. Examples of content represented by an object include a page post, a status update, a photograph, a video, a link, a shared content item, a gaming application achievement, a check-in event at a local business, a brand page, or any other type of content. Online system users may create objects stored by the content store 210, such as status updates, photos tagged by users to be associated with other objects in the online system 140, events, groups or applications. In some embodiments, objects are received from third-party applications or third-party applications separate from the online system 140. In one embodiment, objects in the content store 210 represent single pieces of content, or content "items." Hence, online system users are encouraged to communicate with each other by posting text and content items of various types of media to the online system 140 through various communication channels. This increases the amount of interaction of users with each other and increases the frequency with which users interact within the online system 140.

The action logger 215 receives communications about user actions internal to and/or external to the online system 140, populating the action log 220 with information about user actions. Examples of actions include adding a connection to another user, sending a message to another user, uploading an image, reading a message from another user, viewing content associated with another user, attending an event posted by another user, viewing content on a third party system 130, and interacting with a video on the online system 140. In addition, a number of actions may involve an object and one or more particular users, so these actions are associated with the particular users as well and stored in the action log 220. The action logger 215 also stores temporal information associated with user actions. For example, the action logger 215 stores a timestamp associated with each user action in the action log 220. The timestamp specifies a date and a time when a user action occurred, a date and a time when information describing the user action was received by the action logger 215, or any suitable temporal information describing the user action. For example, the action logger 215 receives a communication from a third party system 130 describing a user action performed on the third party system 130 including a time when the user action occurred and stores store the description of the user action in the action log 220 in association with the time when the user action occurred.

In one embodiment, the action logger 215 receives a pixel tag including action information associated with a user of the online system 140. For example, when the user interacts with a content item via a web browser on a client device 110 for example, a code snippet included in the content item is executed causing the browser to transmit a message including the action information to the action logger 215. The message may also include information identifying the user of the online system 140. The action logger 215 may store the information received via the pixel tag in the action log 220.

The action log 220 may be used by the online system 140 to track user actions on the online system 140, as well as actions on third party systems 130 that communicate information to the online system 140. Users may interact with various objects on the online system 140, and information describing these interactions is stored in the action log 220. Examples of interactions with objects include: commenting on posts, sharing links, checking-in to physical locations via a client device 110 (e.g., a mobile device), viewing or interacting with content, such as pausing or viewing a video, accessing content items, and any other suitable interactions. Additional examples of interactions with objects on the online system 140 that are included in the action log 220 include: commenting on a photo album, communicating with a user, establishing a connection with an object, joining an event, joining a group, creating an event, authorizing an application, using an application, expressing a preference for an object ("liking" the object), and engaging in a transaction. Additionally, the action log 220 may record a user's interactions with advertisements on the online system 140 as well as with other applications operating on the online system 140. In some embodiments, data from the action log 220 is used to infer interests or preferences of a user, augmenting the interests included in the user's user profile and allowing a more complete understanding of user preferences.

The action log 220 may also store user actions taken on a third party system 130, such as an external website, and communicated to the online system 140. For example, an e-commerce website may recognize a user of an online system 140 through a social plug-in enabling the e-commerce website to identify the user of the online system 140. Because users of the online system 140 are uniquely identifiable, e-commerce websites, such as in the preceding example, may communicate information about a user's actions outside of the online system 140 to the online system 140 for association with the user. Hence, the action log 220 may record information about actions users perform on a third party system 130, including webpage viewing histories, advertisements that were engaged, purchases made, and other patterns from shopping and buying. Information stored in the action log 220 may identify an action, a user who performed an action, and a time when the action occurred (or a time when the online system 140 received information describing the action). Additionally, actions a user performs via an application associated with a third party system 130 and executing on a client device 110 may be communicated to the action logger 215 for storing in the action log 220 by the application for recordation and association with the user by the online system 140.

In one embodiment, the edge store 225 stores information describing connections between users and other objects on the online system 140 as edges. Some edges may be defined by users, allowing users to specify their relationships with other users. For example, users may generate edges with other users that parallel the users' real-life relationships, such as friends, co-workers, partners, and so forth. Other edges are generated when users interact with objects in the online system 140, such as expressing interest in a page on the online system 140, sharing a link with other users of the online system 140, and commenting on posts made by other users of the online system 140.

In one embodiment, an edge may include various features each representing characteristics of interactions between users, interactions between users and objects, or interactions between objects. For example, features included in an edge describe a rate of interaction between two users, how recently two users have interacted with each other, a rate or an amount of information retrieved by one user about an object, or numbers and types of comments posted by a user about an object. The features may also represent information describing a particular object or user. For example, a feature may represent the level of interest that a user has in a particular topic, the rate at which the user logs into the online system 140, or information describing demographic information about the user. Each feature may be associated with a source object or user, a target object or user, and a feature value. A feature may be specified as an expression based on values describing the source object or user, the target object or user, or interactions between the source object or user and target object or user; hence, an edge may be represented as one or more feature expressions.

The edge store 225 also stores information about edges, such as affinity scores for objects, interests, and other users. Affinity scores, or "affinities," may be computed by the online system 140 over time to approximate a user's interest in an object or in another user in the online system 140 based on the actions performed by the user. A user's affinity may be computed by the online system 140 over time to approximate the user's interest in an object, in a topic, or in another user in the online system 140 based on actions performed by the user. Computation of affinity is further described in U.S. patent application Ser. No. 12/978,265, filed on Dec. 23, 2010, U.S. patent application Ser. No. 13/690,254, filed on Nov. 30, 2012, U.S. patent application Ser. No. 13/689,969, filed on Nov. 30, 2012, and U.S. patent application Ser. No. 13/690,088, filed on Nov. 30, 2012, each of which is hereby incorporated by reference in its entirety. Multiple interactions between a user and a specific object may be stored as a single edge in the edge store 225, in one embodiment. Alternatively, each interaction between a user and a specific object is stored as a separate edge. In some embodiments, connections between users may be stored in the user profile store 205, or the user profile store 205 may access the edge store 225 to determine connections between users.

One or more advertisement requests ("ad requests") are included in the ad request store 227. An advertisement request includes advertisement content and a bid amount. The advertisement content is text, image, audio, video, or any other suitable data presented to a user. In various embodiments, the advertisement content also includes a landing page specifying a network address to which a user is directed when the advertisement is accessed. The bid amount is associated with an advertisement by an advertiser and is used to determine an expected value, such as monetary compensation, provided by an advertiser to the social networking system 140 if the advertisement is presented to a user, if the advertisement receives a user interaction, or if another suitable condition is fulfilled. For example, the bid amount specifies a monetary amount that the social networking system 140 receives from the advertiser if the advertisement is displayed and the expected value is determined by multiplying the bid amount by a probability of the advertisement being accessed.

Additionally, an advertisement request may include one or more targeting criteria specified by the advertiser. Targeting criteria included in an advertisement request specify one or more characteristics of users eligible to be presented with advertisement content in the advertisement request. For example, targeting criteria are used to identify users having user profile information, edges, or actions satisfying at least one of the targeting criteria. Hence, targeting criteria allow an advertiser to identify users having specific characteristics, simplifying subsequent distribution of content to different users.

In one embodiment, targeting criteria may specify actions or types of connections between a user and another user or object of the social networking system 140. Targeting criteria may also specify interactions between a user and objects performed external to the social networking system 140, such as on a third party system 130. For example, targeting criteria identify users that have taken a particular action, such as sending a message to another user, using an application, joining a group, leaving a group, joining an event, generating an event description, purchasing or reviewing a product or service using an online marketplace, requesting information from a third-party system 130, or any other suitable action. Including actions in the targeting criteria allows advertisers to further refine users eligible to be presented with content from an advertisement request. As another example, targeting criteria identify users having a connection to another user or object or having a particular type of connection to another user or object.

The target group store 230 includes information received from a third party system 130 describing a target group that includes multiple users of the online system 140, allowing the third party system 130 to identify a target group including various online system users to the online system 140. Information received from the third party system 130 describing the target group includes user properties identifying users of the online system 140 to be included in the target group. Online system users having characteristics matching at least a threshold amount of information in the user properties are included in the target group. In one embodiment, the user properties include one or more characteristics associated with a user and specify a threshold number of characteristics. For example, the information received from the third party system 130 includes the following 4 characteristics associated with users of the online system 140: a user is male, the user is connected to at least 50 other users of the online system, the user is at least 25 years old, and the user is within a threshold distance of a location. The received information also specifies a threshold number of 2 characteristics, so the online system 140 identifies users of the online system 140 associated with at least two characteristics matching characteristics specified by the user properties as included in the target group. In the preceding example, the online system 140 identifies users associated with information satisfying at least 2 out of the 4 characteristics included in the information received from the third party system 130 as included in the target group.

In some embodiments, the user properties identify actions, so users who performed the actions are included in the target group. An action identified by the user properties may be performed by a user on the online system 140 or on a third party system 130 communicating with the online system 140. Examples actions include a user interacting with a content item provided by the third party system 130 or the user purchasing a product provided by the third party system 130. A time interval may be associated with an identified action, so a user is included in the target group if the user performed the identified action within the time interval associated with the identified action. For example, a user property describing the target group identifies an action of purchasing a specific product provided by a third party system 130 within 48 hours of a current time for a user to be included in the target group. The user properties describing a target group may specify a variety of user actions associated with various time intervals that are performed internal to or external to the online system 140.

Information describing the target group, in addition to including user properties, also includes metadata associated with the user properties. Metadata associated with a user property specifies limitations on the use of or access to the user properties by the online system 140 or by additional third party systems 130. In one example, metadata associated with the user properties includes access rights identifying additional third party systems 130 authorized to use the different user properties or additional third party systems 130 authorized to use users associated with the target group. The access rights may include identifiers identifying specific additional third party systems 130 authorized to access or to use the user properties describing the target group. Additionally, the access rights may include characteristics of additional third party systems 130 authorized to use or to access the user properties describing the target group. For example, the access rights authorize third party systems 130 associated with specific keywords, associated with specific content items, associated with specific products, or associated with specific services to access user properties describing a target group.

Metadata associated with user properties describing a target group may also specifies an amount of the revenue received by the online system 140 from presenting content based on the target group to provide to the third party system 130 that described a target group if the user properties describing the target group were used to select content to present to online system users. The online system 140 may obtain revenue for presenting content to users and may select users to whom content is presented based on one or more user properties describing a target group provided by the third party system 140. Metadata associated with user properties describing the target group specifies am amount of revenue received by the online system 140 for presenting content based on the user properties the third party expects to receive as compensation for providing the online system 140 with the user properties describing the target group. In one example, metadata associated with the user properties describing the target group specifies a percentage of the revenue received by the online system 140 that is to be provided to the third party system 130 in exchange for using the user properties describing the target group to select content for presentation. However, in other embodiments, metadata specifies other suitable forms for determining the amount of revenue received by the online system 140 to be provided to the third party system 130. For example, the metadata specifies a specific amount, a tiered range of percentages based on a number of user properties describing the target group that were used to select content for presentation, or different amounts to receive for different user properties describing the target group. In addition to metadata describing the access rights associated with user properties and specifying an amount of compensation for the third party system 130 to receive if the user properties are used to select content for presentation to users, metadata associated with the user properties describing a target group may include additional information describing the user properties, such as a type of user properties describing the target group, or particular uses of the user properties describing the target group.

The target group store 230 also stores information associated with a user included in a target group. In some embodiments, when the online system 140 determines a user is included in a target group based on the user properties describing the target group, the online system 140 stores information associated with the user in the target group store 230. For example, the online system 140 stores a user identifier and information describing characteristics of the user satisfying the user properties in the target group store 230 in association with an identifier of a target group described by the user properties. If the user properties describing the target group identify actions performed by a user, the online system 140 stores an action performed by a user satisfying the user properties and a time associated with the action performed in the user in association with a user identifier and a target group identifier in the target group store 230. Additional information describing the action associated with the user, such as an identifier of an object or another user associated with the action, may also be stored in the target group store 230. Other characteristics associated with the user may also be stored in the target group store 230, such as characteristics of the user satisfying user properties describing a target group. For example, the target group store 230 stores characteristics of a user included in a target group that satisfy user properties describing the target group, actions performed by the user included in the target group that satisfy user properties describing the target group (e.g. a description of the actions, times associated with the actions, objects or other users associated with the actions, etc.).

The property management module 235 maintains and manages information describing target groups, including the user properties describing target groups received from one or more third party systems 130. In some embodiments, the property management module 235 provides third party systems 130 with an application interface via which a third party system 130 provides the online system 140 with information describing a target group. Alternatively, the property management module 235 receives information describing a target group from a third party systems 130 through any suitable communication channels, such as through an application programming interface provided by the online system 140 to third party systems 130. User properties and other information describing target groups received by the property management module 235 are communicated to the target group store 230 for storage.

As described above, information describing a target group includes metadata regulating access to user properties describing the target group or to other information describing the target group. When an additional third party system 130 requests access to or use of a target group described by a third party system 130, the property management module 235 determines whether the additional third party system 130 is authorized to access or to use the user properties describing the target group based on metadata associated with the user properties describing the target group, as further described below in conjunction with FIG. 3. The property management module 235 also determines an amount of the revenue received by the online system 140 from content presented to users included in a target group described by a third party system 130 to allocate to the third party system 130 based on the metadata associated with the user properties describing the target group.

Additionally, the property management module 235 identifies users of the online system 140 for inclusion in a target group based on the user properties describing the target group and characteristics of the users. The property management module 235 retrieves characteristics of a user from the user profile store 205 and actions associated with the user from the action log 220 and determines whether the information associated with the user satisfies at least a threshold number of user properties describing the a target group. Upon identifying a user for inclusion in the target group, the property management module 235 stores a user identifier corresponding to the user in the target group store 235 in association with an identifier associated with the target group. The property management module 235 may also store characteristics of the user retrieved from the user profile store 205 or information describing actions associated with the user retrieved from the action log 220 in the target group store 230. For example, the property management module 235 stores identifiers of objects with which the user has performed certain actions (e.g., actions specified by user properties describing the target group) interacted on the online system 140 or on a third party system 130 in the target group store 230. As a specific example, the property management module 235 determines a user included in a target group has interacted with a set of video data via the online system 140 and has interacted with a set of products via the third party system 130 from information associated with the user retrieved from the action log 220 and stores identifiers identifying the set of videos and the set of products in the target group store 235 and associates the identifiers with an identifier of the user included in the target group.

In various embodiments, the property management module 235 identifies objects with which a user interacted that are specified in user properties describing a target group and does not identify objects with which the user interacted that are note specified in the user properties describing the target group. For example, a user property of a target group specifies a user has viewed content associated with a set of products provided by the third party system within a given time interval. The property management module 235 identifies users of the online system 140 who have viewed content associated with the set of products provided by the third party system within the given period of time, includes the identified users in the target group, and stores information associated with the identified users in the target group store 235 specifying times within the given period of time the user viewed content associated with the set of products and product identifiers associated with content with which the user viewed.

The property management module 235 may periodically monitor information in the target group store 230 for accuracy. For example, the property management module 235 determines if a user previously included in a target group should continue to be included in the target group. For example, as users perform actions with objects or content, more recently performed actions may occur outside of time intervals associated with actions in user properties describing a target group, causing actions associated with a user to fail to satisfy the user properties. The property management module 235 retrieves characteristics and actions associated with a user included in a target group and again determines if to include the user in the target group by comparing the retrieved characteristics and actions with user properties describing the target group. In some embodiments, the property management module 235 retrieves characteristics and actions that were modified or received after the initial determination to include the user in the target group. If the property management module 235 determines the retrieved user characteristics or actions no longer satisfy the user properties describing the target group, the property management module 235 removes the user from the target group; for example, a user identifier associated with the user is removed from the target group store 230, or an association between the user identifier and an identifier of the target group is removed from the target group store 230. For example, a user property describing a target group identifies an action of viewing content provided by a third party system 130 between 95 and 48 hours of a current time. The property management module 235 determines from the action information associated with the user stored in the action log 220 that a user included in the target group subsequently viewed content provided by the third party system 130 less than 48 hours from the current time, so the property management module 235 removes the user from the target group. As another example, if the user properties describing a target group specify viewing content provided by a third party system 130 within 48 hours of a current time and a user has viewed content provided by the third party system 130 within 48 hours of the current time, the property management module 235 includes the user in the target group. As time elapses, the property management module 235 compares the user's actions over time to the user properties describing the target group, if the user has not viewed content provided by the third party system within 48 hours of a time when the property management module 235 compares the user's actions to the user properties describing the target group, the property management module 235 removes the user from the target group. Alternatively, the property management module 235 may continue to include the user in the target group if additional characteristics associated with the user satisfy at least a threshold number of user properties describing the target group.

The content selection module 240 selects one or more content items for communication to a client device 110 to be presented to a user. Content items eligible for presentation to the user are retrieved from the content store 210 or from another source by the content selection module 240, which selects one or more of the content items for presentation to the viewing user. A content item eligible for presentation to the user is a content item associated with at least a threshold number of targeting criteria satisfied by characteristics of the user or is a content item that is not associated with targeting criteria. In various embodiments, the content selection module 240 includes content items eligible for presentation to the user in one or more selection processes, which identify a set of content items for presentation to the viewing user. For example, the content selection module 240 determines measures of relevance of various content items to the user based on characteristics associated with the user by the online system 140 and based on the user's affinity for different content items. Based on the measures of relevance, the content selection module 240 selects content items for presentation to the user. As an additional example, the content selection module 240 selects content items having the highest measures of relevance or having at least a threshold measure of relevance for presentation to the user. Alternatively, the content selection module 240 ranks content items based on their associated measures of relevance and selects content items having the highest positions in the ranking or having at least a threshold position in the ranking for presentation to the user.

Content items selected for presentation to the user may include advertisement requests ("ad requests") or other content items associated with bid amounts. A bid amount specifies a maximum amount of compensation the online system 140 receives from an entity, such as a third party system 130, for presenting a content item associated with the entity or when a user performs an action specified by the third party system 130 and associated with the entity. The content selection module 240 uses the bid amounts associated with ad requests when selecting content for presentation to the viewing user. In various embodiments, the content selection module 240 determines an expected value associated with various ad requests (or other content items) based on their bid amounts and selects content items associated with a maximum expected value or associated with at least a threshold expected value for presentation. An expected value associated with an ad request or with a content item represents an expected amount of compensation to the online system 140 for presenting an ad request or a content item. For example, the expected value associated with an ad request is a product of the ad request's bid amount and a likelihood of the user interacting with the ad content from the ad request. As further described below, ad requests may include a target group in targeting criteria, so the content selection module 240 retrieves advertisements from the content store 210 identifying a target group including a user for presentation to the user. The content selection module 240 may rank ad requests based on their associated bid amounts and select ad requests having at least a threshold position in the ranking for presentation to the user. In some embodiments, the content selection module 240 ranks both content items not associated with bid amounts and ad requests in a unified ranking based on bid amounts associated with ad requests and measures of relevance associated with content items and ad requests. Based on the unified ranking, the content selection module 240 selects content for presentation to the user. Selecting ad requests and other content items through a unified ranking is further described in U.S. patent application Ser. No. 13/545,266, filed on Jul. 10, 2012, which is hereby incorporated by reference in its entirety.

In various embodiments, the content selection module 240 presents content to a user through a newsfeed including a plurality of content items selected for presentation to the user. One or more ad requests may also be included in the feed. The content selection module 240 may also determine the order in which selected content items or advertisements are presented via the feed. For example, the content selection module 240 orders content items or advertisements in the feed based on likelihoods of the user interacting with various content items or advertisements.

The web server 245 links the online system 140 via the network 120 to the one or more client devices 110, as well as to the one or more third party systems 130. In some embodiments, the web server 245 links the online system 140 directly to one or more third party systems 130. The web server 245 serves web pages, as well as other content, such as JAVA®, FLASH®, XML and so forth. The web server 250 may receive and route messages between the online system 140 and the client device 110, for example, instant messages, queued messages (e.g., email), text messages, short message service (SMS) messages, or messages sent using any other suitable messaging technique. A user may send a request to the web server 245 to upload information (e.g., images or videos) that are stored in the content store 210. Additionally, the web server 245 may provide application programming interface (API) functionality to send data directly to native client device operating systems, such as IOS®, ANDROID™, WEBOS® or BlackberryOS.

Maintaining Information about a Target Group Specified by a Third-Party System

Figure 3:
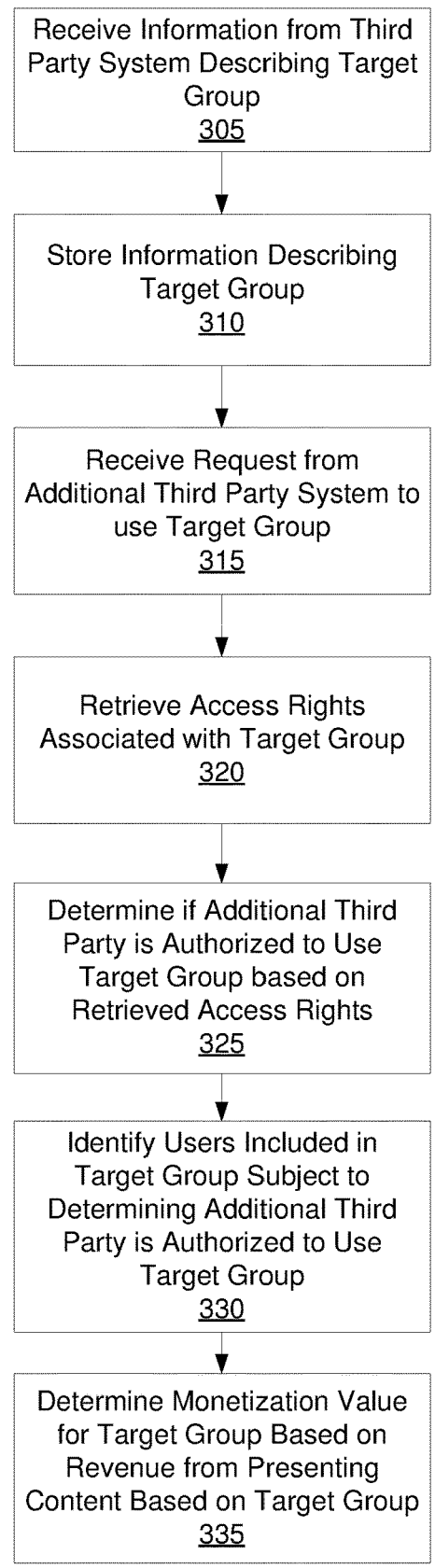
FIG. 3 is a flowchart of a method for maintaining information describing target groups provided to an online system by a third party system, in accordance with an embodiment.

FIG. 3 is a flow chart of a method for maintaining information describing target groups provided to an online system 140 by a third party system 130. In other embodiments, the method may include different and/or additional steps than those described in conjunction with FIG. 3. Additionally, in some embodiments, the method may perform the steps described in conjunction with FIG. 3 in different orders.

Content items received or maintained by the online system 140 may be associated with one or more targeting criteria, which identify characteristics of users eligible to be presented with the content items. Users associated with characteristics satisfying at least a threshold number of targeting criteria associated with a content item are determined to be eligible to be presented with the content item. In some embodiments, the online system 140 maintains information describing target groups, with each target group include online system users having characteristics specified by user properties describing a target group. Target groups maintained by the online system may be used as targeting criteria by one or more third party systems 130 to identify users to receive a content item, subject to limitations on access to the user properties describing various target groups specified by a third party system 130 that provided the user properties to the online system 140.

The online system 140 receives 305 information from a third party system 130 describing a target group that includes multiple users of the online system 140. The information received 305 from the third party system 130 includes user properties identifying users of the online system 140 to be included in the target group. Based on characteristics online system and the user properties describing the target group, the online system 140 identifies users to include in the target group. Online system users having at least a threshold number of characteristics matching user properties describing the target group are included in the target group.

As described above in conjunction with FIG. 2, the user properties may identify actions associated with users of the online system 140, as well as time intervals associated with the actions. For example, the user properties identify an action of expressing a preference for a specific content item within a specified time interval, so users who expressed the preference for the specific content item during the specified time interval satisfy the user properties. Additionally, user properties may specify a threshold number of user properties to be satisfied by characteristics of a user for the user to be included in the target group. The received information also includes metadata associated with the user properties including access rights that regulate access to one or more of the user properties by third party systems 130 other than the third party system 130 from which the information describing the target group was received. Metadata included in the information describing the third party group is further described above in conjunction with FIG. 2.

The online system 140 may receive 305 information describing the target group from a third party system 130 via an application program interface provided to the third party system 130 by the online system 140. In other examples, the online system 140 may receive the information describing the target group via other communication channels. Further, the online system 140 may receive instructions from the third party system 130 to derive user properties describing the target group from pre-established user characteristics maintained by the online system 140 or the third party system 130. For example, instructions from the third party system 130 specify combinations of user characteristics maintained by the online system 140, so users having the specified combinations of characteristics are included in the target group.

Information describing the target group received 305 from the third party system 130 is stored 310 by the online system 140. In addition to storing the information describing the target group the online system 140, may also identify users of the online system 140 included in the target group based on the user properties describing the target group and stores information identifying users included in the target group (e.g., user identifiers, usernames, etc.) in association with an identifier associated with the target group (e.g., a target group identifier uniquely generated for each target group, a combination of a name of the target group and an identifier of the third party system 130 from which the information describing the target group was received, or any other suitable information). After the information describing the target group is stored 310 by the online system 140, the target group may subsequently be used to identify users eligible to be presented with various content items. For example, content items may include targeting criteria identifying the target group so the content items are eligible for presentation to users included in the target group but not eligible for presentation to users not included in the target group.

The received information describing the target group may include metadata regulating access to the user properties describing the target group by additional third party systems 130, allowing the third party system 130 that provided the user properties to the online system 140 to regulate access to and use of the user properties. In various embodiments, the online system 140 receives 315 a request from an additional third party system 130, which is different from the third party system 130 that described the target group, to use one or more of the user properties describing the target group or to user the target group to identify users eligible to be presented with content associated with the additional third party system 130, the online system 140 retrieves 140 metadata. For example, the additional third party system 130 requests access to use the user properties associated with the target group. In another example, the additional third party system 130 requests 315 access to the users included in the target group described by the information provided by the third party system 130. The request received from the additional third party system 130 may include an identifier identifying the target group and additional information specifying specific user properties associated with the identified target group.

In response to receiving 315 the request from the additional third party system 130 to use the target group described by the third party system 130, retrieves 320 metadata included in the received information describing the target group and identifies access rights for the user properties describing the target group from the retrieved metadata. For example, access rights included in the metadata regulates access by other third party systems 130 to or user of the target group. In other examples, the access rights included in the metadata regulate access to various user properties describing the target group by other third party systems 130.

Based on the access rights included in the retrieved metadata, the online system 140 determines 325 if the additional third party system 130 is authorized to use or to access the target group. For example, the retrieved access rights identify specific third party systems 130 are authorized to use one or more user properties describing the target group, so the online system 140 determines 325 whether the additional third party system 130 is identified by the retrieved access rights. In some embodiments, the online system 140 determines 325 whether an identifier of the additional third party system 130 matches an identifier specified by the retrieved access rights. If the identifier of the additional third party system 130 matches an identifier specified by the retrieved access rights, the online system 140 determines 325 the additional third party system 130 is authorized to access or to use the one or more user properties.

Alternatively, the retrieved access rights associated with one or more of the user properties describing the target group specify characteristics associated with additional third party systems 130 that are authorized to use or to access a user property describing the target group. For example, access rights associated with a user property specify that additional third party systems 130 authorized to use the user property are third party systems 130 identified as online merchants or are identified as advertisers. The online system 140 determines the additional third party system 130 is authorized to use or to access the user property of the target group if at least a threshold number of characteristics of the additional third party system 130 match characteristics specified by the access rights associated with the user property. In the preceding example, the additional third party system 130 is authorized to use the user property if the additional third party system is an advertiser or is an online merchant. In other examples, the third party system 130 selects access rights associated with user properties from various settings regulating use of the user properties. For example, the third party system 130 associates access rights with user properties describing the target group indicating the access rights are publicly accessible to other third party systems 130; alternatively, the third party system 130 associates access rights with user properties describing the target group indicating the access rights are private, preventing other third party systems 130 from using the user properties.

Upon determining 325 that the additional third party system 130 is authorized to access or to user one or more user properties describing the target group, the online system 140 identifies 330 users included in the target group. For example, the online system 140 retrieves user identifiers or other information identifying users associated with an identifier of the target group. The users identified 330 as included in the target group are eligible to be presented with one or more content items associated with the additional third party system 130 and includes one or more content items associated with the additional third party system 130 that include the target group as targeting criteria in one or more selection processes for selecting content to present to the identified users.

The online system 140 also determines 335 an amount of the revenue received by the online system 140 from presenting content associated with the additional third party system 130 to users based on the target group to provide to the third party system 130. In some embodiments, the metadata associated with the user properties describing the target group specifies an amount of compensation to the third party system 130 in exchange for use of the target group to identify users eligible to be presented with content, such as a specific monetary amount. Alternatively, the metadata associated with the user properties describing the target group specifies a percentage of revenue received by the online system 140 for presenting content associated with the additional third party system 130 to provide to the third party system 130. In other examples, the revenue metadata may specify other forms of determining the amount of revenue received by the online system 140 to be provided to the third party system 130, such as a specific amount, a tiered range of percentages based on the number of user properties of the target group that were used, or a different amount for different user properties of the target group. The online system 140 retrieves the metadata associated with the user properties describing the target group and the amount of the revenue received by the online system 140 from presenting content based on the user properties of the target group to provide to the third party system 130 based on the retrieved metadata. If the online system 140 presents content associated with the additional third party system 130 to users because the users are included in the target group, the online system 140 obtains compensation from the additional third party system 130 and provides the amount of revenue received specified by the metadata to the third party system 130.

Receiving Information Describing User Actions from a Client Device

Figure 4:
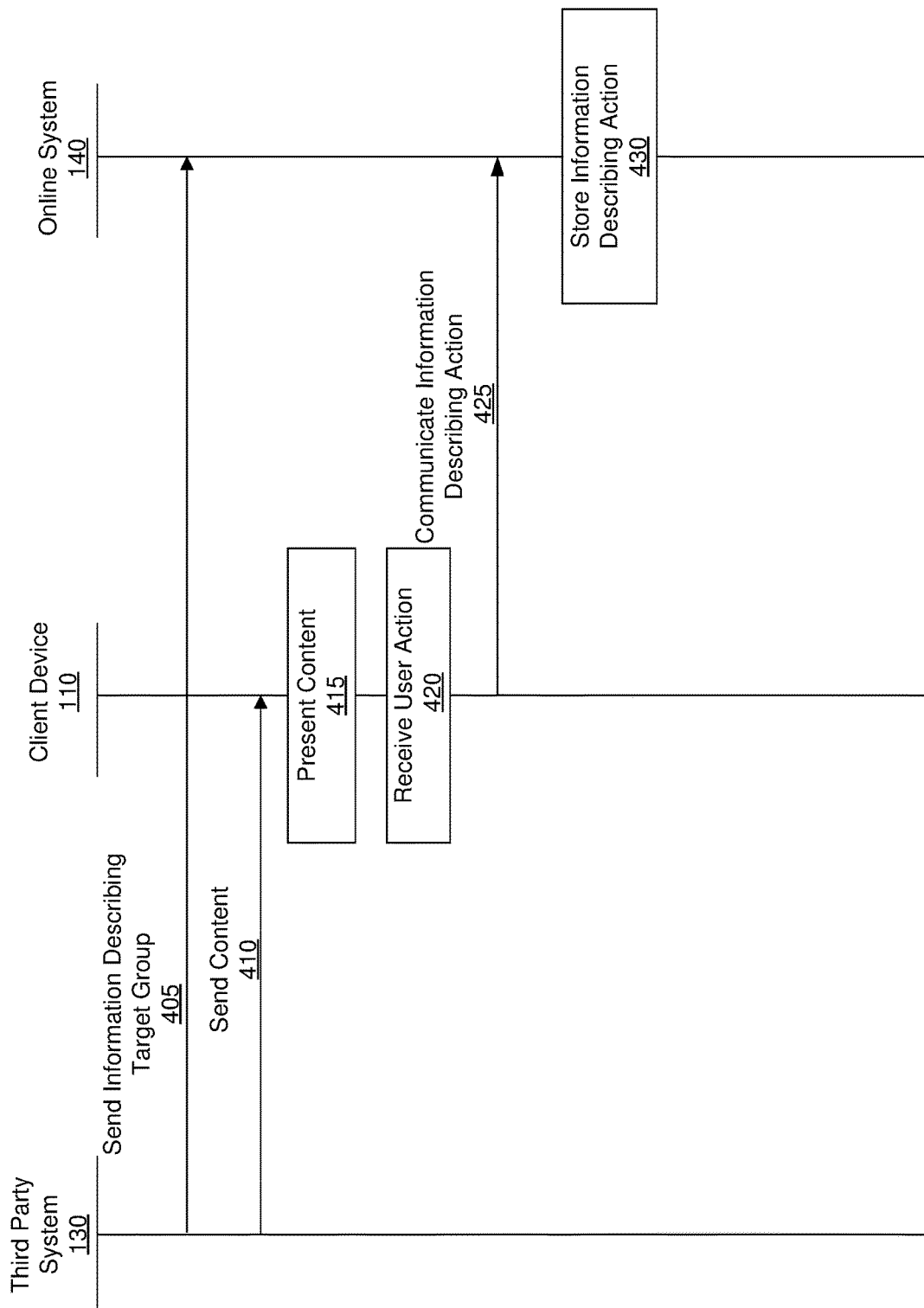
FIG. 4 is an interaction diagram of a method for communicating information describing an action by a user with content provided by a third party system to an online system, in accordance with an embodiment.

FIG. 4 is an interaction diagram of a method for communicating information describing an action by a user with content provided by a third party system 130 to an online system 140. The third party system 130 sends 405 information to the online system 140 information describing a target group, as described above in conjunction with FIGS. 2 and 3. The online system 140 stores the information describing the target group. For example, the online system 140 receives and stores user properties identifying characteristics of users included in a target group. Additionally, the third party system 130 sends 410 content such as a content item, to a client device 110 associated with a user of the online system 140 for presentation to the user. For example, the third party system 130 receives a request for content from the client device 110 and sends the content 410 to the client device 110 upon receiving the request. The content sent 410 by the third party system 130 to the client device 110 includes a tracking mechanism that identifies one or more actions associated with the content provided by the third party system 130 and includes instructions that are executed by the client device 110 when a user performs one or more of the identified actions associated with the content provided by the third party system 130. Example actions specified by the third party system 130 in the tracking mechanism include adding a product to an online shopping cart maintained by the third party system 130, adding a product to a list of products associated with the user by the third party system 130, requesting information from the third party system 130, subscribing to a service provided by the third party system 130, storing content to the third party system 130, storing content provided by the third party system 130 to the client device 110, indicating a preference for content provided by the third party system 130, sharing content provided by the third party system 130 with another user, or providing a comment associated with content provided by the third party system 130. However, in various embodiments, the third party system 130 identifies any suitable action in the tracking mechanism, so the instructions in the tracking mechanism may be executed when the user performs any suitable action with the content from the third party system 130 that is identified by the tracking mechanism. The tracking mechanism may be instructions in HTML, XML, JAVASCRIPT™, or any other programming language.

In some embodiments, the third party system 130 includes different tracking mechanisms in different content provided by the third party system 130; for example, tracking mechanisms included in different content communicate information when different actions are performed with different content. For example, if the third party system 130 is an online merchant, the third party system 130 includes tracking mechanisms in content presenting products for purchase by users that communicate information when the user selects a product for purchase or stores a product in association with the user and includes another tracking mechanism in content allowing the user to search the third party system 130 that communicates information when the user searches the third party system 130. As another example, the third party system 130 includes different tracking mechanisms in various web pages provided by the third party system 130, so a tracking mechanism included in a web page executes instructions when an action with the web page matching an interaction specified by the tracking mechanism is received; hence, the third party system 130 may include tracking mechanisms specifying different actions in various web pages. Alternatively, the third party system 130 includes a common tracking mechanism in various content provided by the third party system 130, allowing an action performed with various content provided by the third party system 130 to be identified by the common tracking mechanism.

The client device 110 presents 415 the content received from the third party system 130 to the user. For example, the client device 110 presents 415 the content item to the user via an application executing on the client device 110, such as a web browser application or an application associated with the third party system 130. When the client device 110 receives 420 an action associated with the content provided by the third party system 130 that matches an action specified by the tracking mechanism included in the content, the client device 110 executes instructions in the tracking mechanism that communicate 425 information describing the action associated with the content provided by the third party system 130 to the online system 140. Information communicated 425 to the online system 140 identifies the action and identifies content provided by the third party system 130 involved in the action. For example, if the received action included a product provided by the third party system 130 in an online shopping cart or in a list associated with the user by the third party system 130, the information describing the action includes an identifier of the product used by the third party system 130. As another example, if the received action involved a content item provided by the third party system 130 (e.g., saving an image, sharing an article with another user), the information communicated 425 to the online system 140 includes an identifier of the content item used by the third party system 130. Various methods may be used to communicate 425 the information describing the action associated with the content provided by the third party system 130 to the online system 140. For example, after receiving 420 the action matching an action specified by a tracking mechanism included in the presented content, the client device 110 executes instructions in the tracking mechanism that creates a frame in the content provided by the third party system 130, where the created frame is associated with the online system 140 (e.g., the frame is in a domain of the online system 140). Information describing the received action with the content provided by the third party system 130 is communicated 425 to the online system 140 via the frame. Additionally, the online system 140 retrieves information identifying the user who performed the action described by the information communicated 425 by the tracking mechanism from the client device 110 to the online system 140.

The online system 140 retrieves user identifying information associated with the user by the online system 140 and stores 430 the information describing the action in association with the user identifying information. For example, the online system 140 retrieves a cookie previously communicated by the online system 140 to an application (e.g. a browser) executing on the client device 110 and stored on the client device 110 when the online system 140 receives the information communicated 425 from the client device 110 to the online system 140 by the tracking mechanism. The online system 140 stores 430 the information describing the action in association with the retrieved user identifying information to maintain a record of actions by the user with content provided by the third party system 130. For example, the online system 140 identifies a user profile associated with the user identifying information and stores 430 the information describing the action with the content provided by the third party system 130 from the tracking mechanism in association with the user profile. Hence, as various users perform actions associated with content provided by the third party system 130 matching actions specified by one or more tracking mechanisms included in the content provided by the third party system 130, the online system 140 stores 430 information associated with the users identifying their actions associated with content provided by the third party system 130, allowing storage of actions by the users that involve content provided by the third party system 130 without providing information identifying the users, or information describing characteristics of the users, to the third party system 130. For example, the third party system 130 is unable to retrieve information maintained by the online system 140 in association with the users who performed the actions, while the online system 140 maintains a record of the actions by online system users with content provided by the third party system 130.

Providing Advertisements to Users of a Target Group

Figure 5:
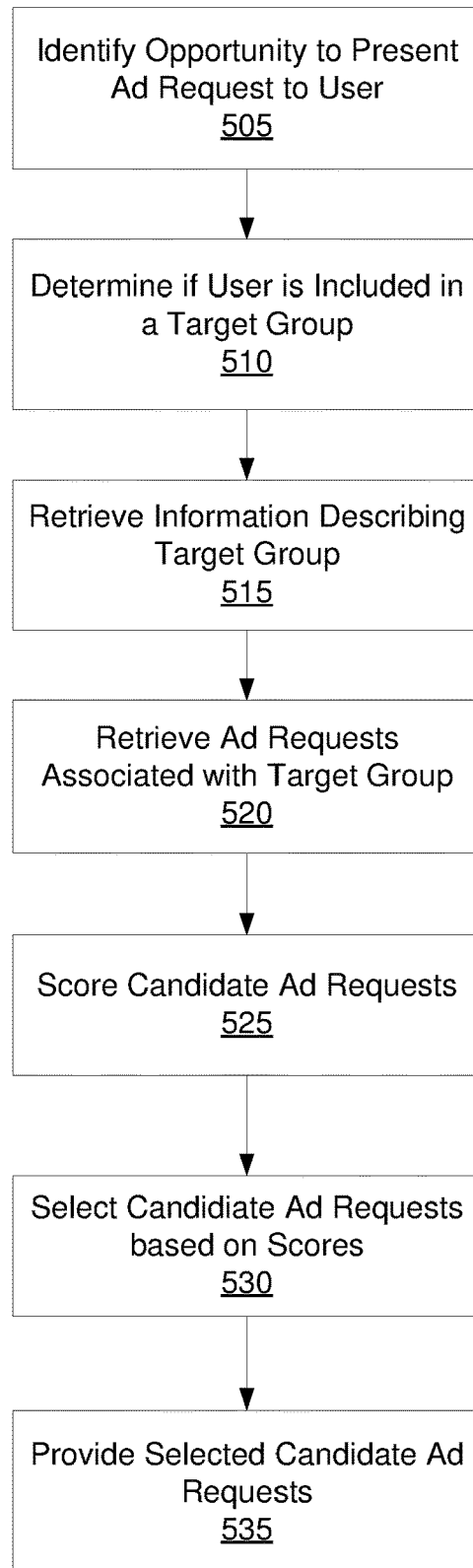
FIG. 5 is a flowchart of a method for providing advertisement content to users associated with a target group maintained by the online system, in accordance with an embodiment.

FIG. 5 is a flow chart of a method for providing advertisement content to users associated with a target group maintained by the online system 140. In other embodiments, the method may include different and/or additional steps than those described in conjunction with FIG. 5. Additionally, in some embodiments, the method may perform the steps described in conjunction with FIG. 5 in different orders.

The online system 140 identifies 505 an opportunity to present one or more advertisement request ("ad request") to a user of the online system 140. For example, the online system 140 receives a request from an application executing on the user's client device 110 for content items to present to the user. The received request may identify a number of ad requests to include in the content items to present to a user. Alternatively, the online system 140 identifies 505 an opportunity to present an ad request to the user when the online system 140 receives a request for content from the user or receives an indication the user performed another suitable action (e.g., logged into the online system 140).

When the opportunity to present one or more ad requests to the user arises, the online system 140 determines 510 if the user is associated with a target group. The online system retrieves characteristics of the user maintained by the online system 140, including actions associated with the user, and determines if the characteristics of the user satisfy at least a threshold number of user properties describing the target group, as described above in conjunction with FIGS. 2 and 3. If the characteristics of the user satisfy at least the threshold number of user properties describing the target group, the online system 140 determines 510 that the user is included in the target group.

In some embodiments, if the user was previously determined to be included in the target group, the online system 140 retrieves characteristics of the user that have been modified since the prior determination and determines 510 whether to continue including the user in the target group based on the modified characteristics, as the user's characteristics may change over time so the characteristics no longer satisfy the threshold number of user properties. As an example, user properties describing the target group specify an action and a time interval in which the action was performed relative to a current time (e.g., a time when the opportunity to present an ad request to the user was identified 505). To determine if the user is still included in the target group, the online system 140 retrieves actions previously performed by the user and maintained by the online system 140 as well as times associated with the previously performed actions. In some embodiments, the online system 140 identifies a previously performed action matching the action specified by the user properties that is associated with a time nearest to the current time and determines if the time associated with the time associated with the identified action is within the time interval specified by the user properties. If the time associated with the identified action is not within the specified time interval, the online system 140 determines 510 the user is not included in the target group at the current time; however, if the time associated with the identified action is within the specified time interval, the online system 140 determines 510 the user remains included in the target group at the current time.

For example, a user property describing the target group specifies an action of viewing content provided by the third party system 130 within 48 hours of a current time. Based on actions associated with the user, including actions associated with the user after an initial determination the user was included in the target group, the online system 140 determines if the user has viewed content provided by the third party system 130 within 48 hours of the current time to determine 510 if the user remains included in the target group. If the user's most recent viewing of content provided by the third party system 130 occurred more than 48 hours from the current time, the online system 140 determines 510 the user is no longer included in the target group. However, if the user viewed content provided by the third party system 130 within 48 hours of the current time, the online system 140 determines 510 the user remains included in the target group.

In response to determining 510 the user is included in the target group, the online system 140 retrieves 515 stored information describing the target group. For example, the online system 140 retrieves 515 the user properties describing the target group and the metadata associated with the user properties. Additionally, the online system 140 retrieves information associated with the user, such as information identifying content items (e.g., object identifiers, content item identifiers, etc.) associated with actions performed by the user or identifying actions performed by the user. The information associated with the user may include information associated with the user during a specific time interval.

The online system 140 retrieves 520 ad requests including the target group as targeting criteria and identifies candidate ad requests as ad requests including at least a threshold number of targeting criteria that are satisfied by characteristics of the user. For example, the online system 140 identifies ad requests with targeting criteria specifying inclusion in the target group without specifying additional user characteristics as candidate ad requests. In some embodiments, the online system 140 retrieves 520 ad requests that include an identifier of the target group in targeting criteria. Alternatively, the online system 140 retrieves 520 ad requests including targeting criteria specifying a combination of user characteristics matching user properties that describe the target group. For example, the target group includes user properties of: male, 25 years or older, and have viewed a specific sporting good in the last 24 hours. The online system 140 may retrieve ad requests including targeting criteria specifying targeting criteria identifying male users who are at least 25 years old and who have viewed the specific sporting good within 24 hours of a current time. Characteristics of the user are compared to additional targeting criteria, if any, included in the retrieved ad request, and retrieved ad requests including at least a threshold number of targeting criteria satisfied by the characteristics of the user are identified as candidate ad requests.

In some embodiments, the online system 140 selects content for presentation by an ad request identified as a candidate ad request based on characteristics associated with the user. For example, a candidate ad request includes an instruction for the online system 140 to select content presented by the ad request based on actions associated with the user. For example, the candidate ad request identifies a specific action or a time interval, so the online system 140 retrieves the specific action performed by the user or retrieves actions performed by the user within the time interval. The online system 140 then identifies objects (e.g., products, content items) associated with the retrieved actions. As another example, the candidate ad request identifies an object and a time interval, so the online system 140 retrieves actions performed by the user associated with the object and occurring within the time interval. In other embodiments, the online system 140 identifies objects with which the user performed an action (or performed one or more specific actions) at times closest to a current time. Based on the identified objects, the online system 140 selects content for presentation by the candidate ad request. For example, the online system 140 selects content associated with an object with which the user most recently performed an action or most recently performed a specific action. As another example, the online system 140 selects content associated with an object with which the user performed an action or performed an action specified by the candidate ad request within a time interval specified by the ad request. In another example, the online system 140 selects content associated with an object with which the user performed a maximum number of actions during a time interval. The content selected by the online system 140 may be included in the candidate ad request, requested from a third party system 130 from which the candidate ad request was received, may be retrieved from the online system 140, or may be generated by the online system 140. In some embodiments, the candidate ad request specifies a hierarchy of actions, so if the user has not performed a specified action with an object, the online system 140 selects advertisement content based on an alternative action performed by the user that has a lower position in the hierarchy of interactions. Similarly, the candidate ad request may specify a hierarchy of objects, so if the user has not interacted with a content item or a product provided by the third party system 130 and specified in the ad request, the online system 140 selects a content item or a product having a lower position in the hierarchy of content provided by the third party system 130 with which the user interacted.

The online system 140 scores 525 the candidate ad requests using one or more selection processes. As described above in conjunction with FIG. 2, a selection process determines measures of relevance of various candidate ad requests to the user based on characteristics associated with the user by the online system 140 and based on the user's affinity for different content. Based on the measures of relevance, the online system 140 selects 530 one or more candidate ad requests for presentation to the user. For example, the online system 140 selects 530 candidate ad requests having the highest measures of relevance or having at least a threshold measure of relevance for presentation to the user. Alternatively, the online system 140 ranks candidate ad requests based on their associated measures of relevance and selects candidate ad requests having the highest positions in the ranking or having at least a threshold position in the ranking for presentation to the user.

Bid amounts associated with candidate ad requests may be used by the online system 140 to select 530 candidate ad requests for presentation to the user, as described above in conjunction with FIG. 2. For example, the online system 140 determines an expected value associated with various candidate ad requests based on their bid amounts and selects 530 candidate ad requests associated with a maximum expected value or associated with at least a threshold expected value for presentation. A number of targeting criteria included in a candidate ad request may modify the score of the candidate ad request in some embodiments. The online system 140 may increase a score of a candidate ad request based on a percentage of targeting criteria included in the candidate ad request satisfied by characteristics of the user. For example, if a candidate ad request includes three targeting criteria and characteristics of the user satisfy two out of three of targeting criteria, the score of the candidate ad request is higher than a score of an additional candidate ad request having three targeting criteria, where the characteristics of the user satisfy one out of the three targeting criteria. The online system 140 provides 535 the selected candidate advertisements to the user. For example, the online system 140 communicates the selected candidate advertisements to a client device 110 for presentation to the user through any suitable communication channel. In various embodiments, the selected candidate ad requests may be included in a feed of content presented to the user by the online system 140, included in a thread of messages between the user and one or more additional users communicated via the online system 140, or presented in any other suitable format.

SUMMARY

The foregoing description of embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the patent rights be limited not by this detailed description, but rather by any claims that issue on an application based hereon. Accordingly, the disclosure of embodiments is intended to be illustrative, but not limiting, of the scope of the patent rights, which is set forth in the following claims.

What is claimed is:

1. A system comprising:
a processor; and
a memory storing instructions that, when executed by a processor, cause the processor to:
receive tracking pixel data corresponding to a plurality of actions performed by a first user of an online system on a third-party site, wherein each action performed by the first user is recorded by a tracking pixel embedded on the third-party site and has a timestamp indicating when the action was performed;
add a first user profile of the first user to a first target group in response to identifying that a first action of the first user in the tracking pixel data satisfies a user property of the first target group, wherein the user property of the first target group defines eligibility for inclusion in the first target group, comprising a target action and a predetermined time interval associated with the target action, and wherein the first action of the first user satisfies the target action of the first target group and the timestamp associated with the first action is within the predetermined time interval associated with the target action;
identify an opportunity to present content items to the first user of the online system;
identify candidate content requests from a first set of content requests directed to the first target group, wherein the candidate content requests comprise a threshold number of targeting criteria satisfied by characteristics in the first user profile of the first user;
select, using a content selection technique performed by the online system, one of the candidate content requests with a first content item to present to the first user based at least in part on the characteristics in the first user profile of the first user; and
present a first content item of the selected candidate content request on a client device of the first user.

2. The system of claim 1, wherein the first content item is an advertisement of an object.

3. The system of claim 1, wherein the instructions further cause the processor to:
identify an additional opportunity to present additional content items to the first user of the online system, the additional opportunity at a subsequent time;
identify an additional action performed by the first user in the tracking pixel data that satisfies the target action of the user property of the first target group and having an additional timestamp nearest to the subsequent time;
determine whether the additional timestamp associated with the additional action is within the time interval of the target action of the user property of the first target group; and
select another one of the candidate content requests with a second content item to present to the first user based at least in part on the characteristics in the first user profile; and
present the second content item on the client device of the first user.

4. The system of claim 1, wherein the instructions further cause the processor to:
select the candidate content request with the first content item to present to the first user based on the characteristics associated with the first user profile of the first user and a monetary amount associated with the first content item of the candidate content request.

5. The system of claim 1, wherein the instructions further cause the processor to:
confirm that the first user belongs in the first target group according to the first user property by:
identifying a timestamp of the identified opportunity to present content items to the first user, and
determining that the timestamp of the first action is within the predetermined time interval from the timestamp of the identified opportunity.

6. The system of claim 1, wherein the instructions further cause the processor to:
select the candidate content request with the first content item to present to the first user based further on the first content item of the candidate content request being associated with an object with which the first user performed a maximum number of actions during the predetermined time interval.

7. The system of claim 1, wherein the selected candidate content request specifies a hierarchy of content including the first content item, and
wherein the instructions cause the processor to:
in response to the first user has not interacted with the first content item presented on the client device of the first user, select a second content item having a lower position in the hierarchy of content with which the first user had previously interacted; and
present the second content item on the client device of the first user.

8. A method comprising:
receiving, by a processor of an online system, tracking pixel data corresponding to a plurality of actions performed by a first user of the online system on a third-party site, wherein each action performed by the first user is recorded by a tracking pixel embedded on the third-party site and has a timestamp indicating when the action was performed;
adding, by the processor, a first user profile of the first user to a first target group in response to identifying that a first action of the first user in the tracking pixel data satisfies a user property of the first target group, wherein the user property of the first target group defines eligibility for inclusion in the first target group, comprising a target action and a predetermined time interval associated with the target action, and wherein the first action of the first user satisfies the target action of the first target group and the timestamp associated with the first action is within the predetermined time interval associated with the target action;
identifying, by the processor, an opportunity to present content items to the first user of the online system;
identifying candidate content requests from a first set of content requests directed to the first target group, wherein the candidate content requests comprise a threshold number of targeting criteria satisfied by characteristics in the first user profile of the first user;
selecting, by the processor, using a content selection technique performed by the online system, one of the candidate content requests with a first content item to present to the first user based at least in part on the characteristics in the first user profile; and presenting, by the processor, a first content item of the selected candidate content request on a client device of the first user.

9. The method of claim 8, wherein the first content item is an advertisement of an object.

10. The method of claim 8, further comprising:
identifying an additional opportunity to present additional content items to the first user of the online system, wherein the additional opportunity is at a subsequent time;
identifying an additional action performed by the first user in the tracking pixel data that satisfies the target action of the user property of the first target group and having an additional timestamp nearest to the subsequent time;
determining whether the additional timestamp associated with the additional action is within the predetermined time interval of the additional timestamp associated with the additional action of the user property of the first target group;
selecting another one of the candidate content requests with a second content item to present to the first user based at least in part on the characteristics in the first user profile; and
presenting the second content item on the client device of the first user.

11. The method of claim 8, wherein selecting one of the candidate content requests with the first content item to present to the first user comprises:
selecting the candidate content request with the first content item to present to the first user based on the characteristics associated with the first user profile of the first user and a monetary amount associated with the first content item of the candidate content request.

12. The method of claim 8, further comprising:
confirming that the first user belongs in the first target group according to the first user property by:
identifying a timestamp of the identified opportunity to present content items to the first user, and
determining that the timestamp of the first action is within the predetermined time interval from the timestamp of the identified opportunity.

13. The method of claim 8, wherein the first content item is an advertisement of an object.

14. The method of claim 8, wherein selecting one of the candidate content requests with the first content item to present to the first user comprises:
selecting the candidate content request with the first content item to present to the first user based further on the first content item of the candidate content request being associated with an object with which the first user performed a maximum number of actions during the predetermined time interval.

15. A non-transitory computer-readable medium storing instructions, which when executed by a processor, cause the processor to:
receive tracking pixel data corresponding to a plurality of actions performed by a first user of an online system on a third-party site, wherein each action performed by the first user is recorded by a tracking pixel embedded on the third-party site and has a timestamp indicating when the action was performed;
add a first user profile of the first user to a first target group in response to identifying that a first action of the first user in the tracking pixel data satisfies a user property of the first target group, wherein the user property of the first target group defines eligibility for inclusion in the first target group, comprising a target action and a predetermined time interval associated with the target action, and wherein the first action of the first user satisfies the target action of the first target group and the timestamp associated with the first action is within the predetermined time interval associated with the target action;
identify an opportunity to present content items to the first user of the online system;
identify candidate content requests from a first set of content requests directed to the first target group, wherein the candidate content requests comprise a threshold number of targeting criteria satisfied by characteristics in the first user profile of the first user;
select, using a content selection technique performed by the online system, one of the candidate content requests with a first content item to present to the first user based at least in part on the characteristics in the first user profile; and
present a first content item of the selected candidate content request on a client device of the first user.

16. The non-transitory computer-readable medium of claim 15, wherein the first content item is an advertisement of an object.

17. The non-transitory computer-readable medium of claim 15, wherein the instructions further cause the processor to:
identify an additional opportunity to present additional content items to the first user of the online system, the additional opportunity at a subsequent time;
identify an additional action performed by the first user in the tracking pixel data that satisfies the target action of the user property of the first target group and having an additional timestamp nearest to the subsequent time;
determine whether the additional timestamp associated with the additional action is within the time interval of the target action of the user property of the first target group; and
select another one of the candidate content requests with a second content item to present to the first user based at least in part on the characteristics in the first user profile; and
present the second content item on the client device of the first user.

18. The non-transitory computer-readable medium of claim 15, wherein the instructions further cause the processor to:
confirm that the first user belongs in the first target group according to the first user property by:
identifying a timestamp of the identified opportunity to present content items to the first user, and
determining that the timestamp of the first action is within the predetermined time interval from the timestamp of the identified opportunity.

19. The non-transitory computer-readable medium of claim 15, wherein the instructions further cause the processor to:
select the candidate content request with the first content item to present to the first user based on the characteristics associated with the first user profile of the first user and a monetary amount associated with the first content item of the candidate content request.

20. The non-transitory computer-readable medium of claim 15, wherein the instructions further cause the processor to:

select the candidate content request with the first content item to present to the first user based further on the first content item of the candidate content request being associated with an object with which the first user performed a maximum number of actions during the predetermined time interval.

\* \* \* \* \*